Feb. 19, 1957

R. PUDELKO ET AL 2,781,975

TOTALIZING METER

Filed April 14, 1952

Inventors
Richard Pudelko
and Hans Pahler
by Morgan, Finnegan and Durham
Attorneys.

United States Patent Office
2,781,975
Patented Feb. 19, 1957

2,781,975

TOTALIZING METER

Richard Pudelko and Hans Tobler, Zug, Switzerland, assignors to Landis & Gyr, A. G., Zug, Switzerland, a body corporate of Switzerland Application April 14, 1952, Serial No. 282,170
Claims priority, application Switzerland April 25, 1951
1 Claim. (Cl. 235—92)

The present invention relates to a novel and improved summation meter for registering the total of a plurality of measured values from different measuring points.

Objects and advantages of the invention will be set forth in part hereinafter and in part will be obvious herefrom, or may be learned by practice with the invention, the same being realized and attained by means of the instrumentalities and combinations pointed out in the appended claim.

The invention consists in the novel parts, constructions, arrangements, combinations and improvements herein shown and described.

The accompanying drawings, referred to herein and constituting a part hereof, illustrate two embodiments of the invention, and together with the description, serve to explain the principles of the invention.

Figure 1:
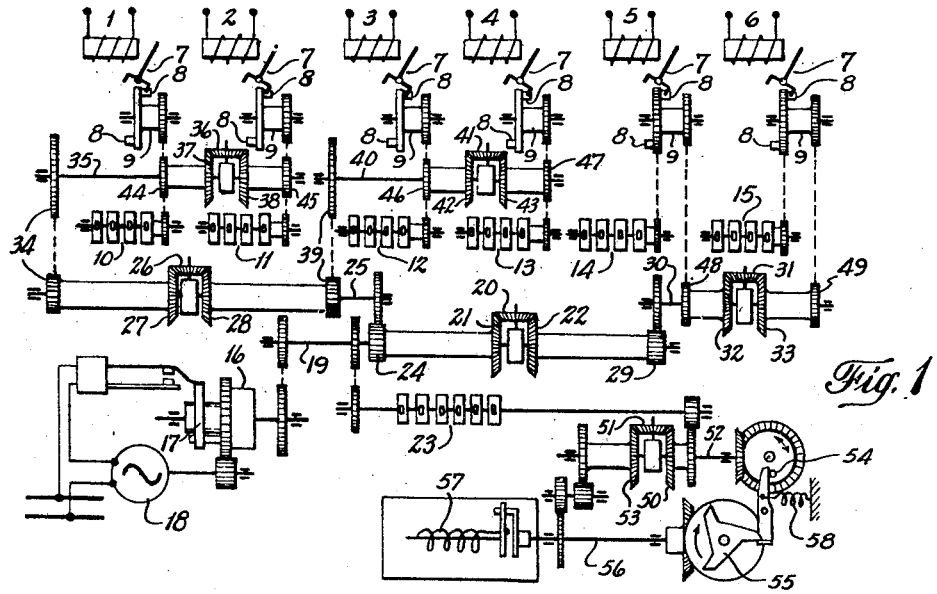
Figure 2:
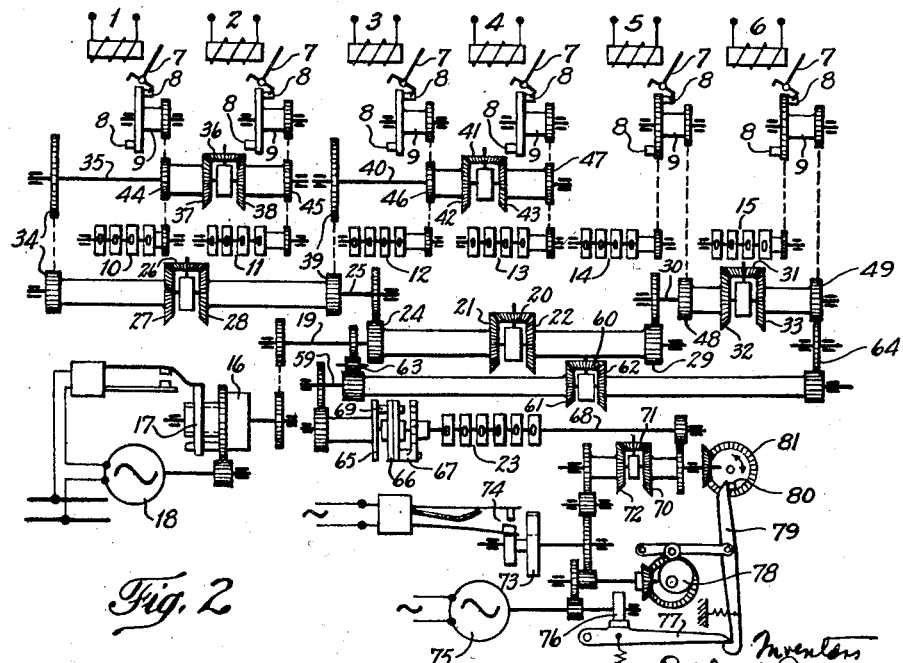

Of the drawings:

Figure 1 is a schematic diagram showing one embodiment of the present invention as applied to the summation of a plurality of values as measured at a plurality of distant points; and Figure 2 is a similar view of another and modified embodiment of the present invention in which certain of the measured values are to be subtracted from the remainder so that the algebraic sum of the measured values is registered or recorded.

The present invention has for its object the provision of a novel and improved summation apparatus for totalizing the values transmitted from remote measuring instruments, such as watt-hour meters measuring the power in several distribution circuits at a central power plant. A further object is the provision of such an instrument which has a greater degree of precision than has been customary with prior instruments of this general kind, and which can satisfactorily respond to the relatively large number of impulses which are necessary for a high degree of accuracy. Still another object is the provision of a summation register in which all of the interconnected trains of gearing are supplied from an independent source with the power needed for their operation.

The present invention provides an apparatus for registering or recording the algebraic sum of a plurality of values measured at remote points, and in which the mechanical power for effecting the summation is derived from a single source and is distributed by branched driving means to the plurality of individual measuring points, each of which may be released independently in accordance with impulses received from the corresponding remote measuring means, and in which the movements of the driving means upon being released are transmitted to a summation device, preferably through many of the same driving means as are used for the transmission of the power from the power source to the measuring points. The branched driving means preferably includes a succession of differentials, pairs of individual measuring points being drivingly connected to a single differential, and the two differentials for two pairs of individual measuring points being connected to another differential which may be connected to still another differential and thereby to the summation register, while the power is preferably supplied to the differential at the summation register, and is distributed from that point back to the several measuring points. Each of the measuring points is conveniently provided with a magnetically actuated escapement, so that as each impulse is received, a definite amount of movement takes place, the sum of these movements being registered by the summation device. If desired, one or more of the measuring points may be connected to two of the successive differentials by gearing of different ratios so that actuation of these measuring points is subtracted from the sum of the other impulses or measured values, thereby actuating the summation device in accordance with the algebraic sum of the remotely measured values. Also, if desired, the summation may be effected by means of a periodically actuated recording device, such as a recording demand meter.

Referring now in detail to the present preferred and illustrative embodiments of the invention as shown in the accompanying drawings, the two illustrated embodiments of the invention are shown as adapted to be actuated by impulses received from six different remote measuring instruments, such as watt-hour meters which are adapted to transmit one impulse each time the consumption of one killowatt-hour has been measured.

As shown in Figure 1 of the drawings, there are provided six receiving relays 1, 2, 3, 4, 5, and 6, each of which has an escapement armature 7 adapted to be released each time that an electric impulse is received by the corresponding relay, the impulses being transmitted from the transmitting meters connected therewith. Each of the armatures 7 cooperates with the associated stop disc 8 of the releasable escapement mechanism 9, the escapement armature being provided with two stop members which are alternatively engageable with the stop pins on the opposite faces of the disc 8 so that a full operation of the armature is required for a full revolution of the disc 8, thereby guarding against accidental or improper operation in case the received impulse is of abnormally long duration. Preferably associated with each of the receiving relays 1–6 and directly actuated by release of the corresponding escapement 9 is a register 10, 11, 12, 13, 14 or 15, which serves to register the total number of impulses received by each of the receiving relays 1–6.

The individual registers 10–15 and the several escapements 9 are all preferably mechanically powered by means of a rotary spring mechanism 16, of conventional form, which is powered by means of a small electric motor 18 energized under control of a switch which is opened and closed by means of a travelling nut 17, so that as soon as the spring has unwound to a predetermined extent, motor 18 is energized and rewinds the spring a predetermined amount, thereby maintaining the spring 16 constantly energized and ready to supply mechanical power to the apparatus as a whole.

Spring mechanism 16 is drivingly connected to the shaft 19 of a differential planet pinion 20 which meshes with the differential sun gears 21 and 22, while shaft 19 is also geared to a totalizing or summation register 23.

The drive from spring mechanism 16 is further branched beyond the differential 20–22, and for this purpose pinion 24, fixed to sun gear 24, drives shaft 25 on which is mounted differential planetary pinion 26 meshing with the sun gears 27 and 28, while the pinion 29 is fixed to sun gear 22 and drives shaft 30 which carries the planetary pinion 31 meshing with differential sun gears 32 and 33.

Sun gear 27 also drives shaft 35 through gearing 34 and thereby drives the differential planetary pinion 36 which meshes with sun gears 27 and 38, which are individually connected by gearing 44 and 45 to the escapements 9 of the receiving relays 1 and 2 respectively. Sun gear 28 is similarly connected through gearing 39 to drive shaft 40 and planetary pinion 41 which meshes with the sun gears 42 and 43 which are individually connected to the escapements 9 of the receiving relays 3 and 4 by gearing 46 and 47 respectively. Gearings 44, 45, 46 and 47 also serve to connect the escapements 9 to their respective individual registers 10, 11, 12 and 13.

Thus, the differential 20–22 receives power from the spring 16 and divides and distributes this power to the differential 26–28 and differential 31–33, while differential 26–28 further divides and distributes the power to the two differentials 36–38 and 41–43, each of which divides and distributes the power to one of the individual escapements 9 for the relays 1–4. Differential 31–33 also divides and distributes the power received by it from motor wound spring 16, and in the illustrative embodiment, this power is directly supplied to the two escapements 9 for the receiving relays 5 and 6. Movement of the spring 16, as it unwinds, is transmitted to shaft 49, rotation of which is controlled by rotation of the sun gear 21 under control of the relays 1–4, and sun gear under control of the relays 5 and 6, and movement of the shaft 19 is transferred by gears to the totalizing register 23, which is preferably connected, in the illustrated manner, by means of a differential gearing 50, 51, 52, 53 to the accumulating mechanism of a periodically reset demand meter, such as the conventional form of a "Printomaxigraph." For this purpose, the shaft of the totalizing register 23 also drives sun wheel 50, while the meshing planet 51 drives shaft 52 and the releasable locking mechanism 43, 55 while the other sun wheel 53 drives the shaft 56 of an engaging member controlled by the releasable locking mechanism 54, 55. Shaft 56 also acts on the spiral spring 57 of the storing mechanism for the demand meter.

By means of the ramification which has been described the torque produced by the spring mechanism 16 acts practically uniformly on the receiving relays 1–6 of the different measuring points. As long as no impulse is to be transmitted at one of these points the force of the spring mechanism is locked by the release mechanisms 9 of the receiving relays 1–6.

If one of the relays receives a current impulse it attracts its armature 7 temporarily and the latter releases the releasing mechanism 9 for one revolution. The releasing mechanism is shown as one of the conventional kind in which when the armature is attracted by sliding off a stop 8 and engaging with the second stop 8, the releasing mechanism makes at first only a partial revolution and performs the rest of the revolution only when the armature 7 drops from the second stop, with the result that registration takes place only after the expiration of the transmitting impulse, no excess registration taking place with an accidental continuously applied contact.

The impulse received by the relay is here assumed to have appeared at the measuring point of the receiving relay 2 in order to illustrate a concrete effect with reference to the example of embodiment. Thus if the release mechanism 9 is set free for one revolution the spring mechanism can turn by means of the shaft 19 of the planet wheel the planet wheel 20, the sun wheel 21, the shaft 25 of the planet wheel, the planet wheel 26, sun wheel 27, the shaft 35 of the planet wheel, the planet wheel 36, the sun wheel 38 and the wheel 45 of the release mechanism 9 of the relay 2 and thus register the impulse which has arrived there on the value indicating meter 11. All the other ramifications of the power transmission from the spring mechanism 16 remain locked, beginning with the sun wheel 22 by means of the differential gear 30–33 on the one hand and the differential gear 40–43 and the sun wheel 37 of the differential gear 35–38 on the other hand. The impulse is, however, registered by the summation meter 23, as it is only after the latter that the branching begins.

However, it is by means of the shaft of the summation meter 23 that the impulse is transmitted to the apparatus which records values, this transmission being effected by the sun wheel 50 of the differential gear 50–53 moving by means of the planet wheel 51 in a clockwise direction, a releasing member 54 represented by a bolt, the latter member releasing a locking lever from a locking star 55, with the result that the storage part 57 is released by means of the sun wheel 53 to receive the impulse. By means of the sun wheel 53 the storage part 57 turns the planet wheel 51 back and with it the releasing member 54, and a return spring 58 causes the locking star 55 to stop again.

As has been previously clearly stated, the apparatus for registering demand values is not a necessary component of the apparatus described; it may therefore be omitted or be replaced by another mechanism which analyzes further the summation values yielded by the meter 23.

The effect described occurs in the same way at each of the assumed measuring points. For example, if an impulse appears at the receiving relay 6, thus in this case at the last measuring point, there results a ramification over the parts 20, 22, 29, 30, 31, 33 and 49 to the release mechanism 9, this receiving relay 6 and its metering mechanism 15 and simultaneous transmission to the summation meter 23 while all the other parts of the ramification are locked.

The apparatus is non-reactive as regards the time sequence of the processing of impulses in the apparatus as they arrive at the different measuring points. Therefore impulses that may arrive at the same time at the different receiving relays 1–6 are immediately sent on to the summation meter 23 and on to the mechanism for the further analysis of the impulses which may be connected to the summation meter.

The number of measuring points values from which are to be processed in the apparatus may also be different from that assumed in the description of the example of embodiment; that number may be greater or smaller.

Figure 2 illustrates a modified embodiment of the invention in which the apparatus is actuated in accordance with the difference between positive and negative impulses received by the several relays, so that these negative and positive values may be algebraically added. In this modified embodiment, many of the parts and their arrangement are identical with that shown in Figure 1. However, between the planetary shaft 19 of the first differential acted on by the spring 16 and the gear 49 controlled by the relay 6, there is provided an additional differential 59, 60, 61, 62, having its sun wheel 61 connected to be driven by gearing 63 from the shaft 19, while its sun wheel 62 is driven through gearing 64 from gear 49. The gear ratio between the gears 49 and 62 is such that there is a 2:1 reduction from gear 62 to gear 64. Also, as distinguished from the embodiment of Figure 1, the totalizing register 23 is driven by shaft 59 from planetary gear 60, rather than directly from shaft 19.

The impulses which are received by and actuate the relays 1 to 5 act in the same way as described in connection with Figure 1, and are totalized in the same manner under the power derived from spring 16. However, the impulses which are received by and actuate the relay 6 cause sun wheel 62 to be rotated in a reverse or subtractive direction at double the speed, while sun gear 61 is rotated in the additive sense at normal speed thereby causing the values sensed by the relay 6 to be subtracted from the total of the impulses sensed by the relays 1 to 5, thereby causing the totalizing register 23 to be actuated in accordance with the difference between these two values.

If the number of received impulses of different counting senses is approximately equal per unit of time they largely cancel each other. There may be certain irregularities, and for a short time impulses of the negative counting sense may preponderate and have the tendency to drive the summation meter 23 in the subtractive direction of rotation. To prevent this the previously mentioned idling coupling 65–67 has been arranged. This coupling is of a conventional form and has two juxtaposed discs 66, one of which is provided with a circular slot and the other with an engaging pin 69 movable in said slot. The path of the engaging pin 69 corresponds to the angle within which rotation of the shaft 59 of the planet wheel can take place without being transmitted to the summation meter 23. The idling angle may be made larger or smaller by angularly adjusting the two discs in relation to each other. If the impulses of positive and negative direction arrive shortly one after the other they cancel each other within the storing power given by the setting of the slot. In order to prevent the meter 23 being driven in the reverse direction when the storage in the negative direction is exhausted an overrunning gear with pawl is attached to the discs 66. If the storage power is exhausted the pawl 67 slides over the teeth of the ratchet wheel with which it cooperates without this influencing the summation meter 23.

The difference from more than one measuring point could also be formed in the apparatus, which would only require additional differential gears with the corresponding gearing-down to the corresponding release and metering mechanism or mechanisms of the respective receiving relays.

In this exemplary embodiment of the present invention a transmitting arrangement is provided for by mechanism further analyzing the summation differential value and passing it on. This arrangement, which is old per se, has a differential gear 70–72, a tilting weight 73 acting on a transmitter contact 74, an auxiliary motor 75 which drives the tilting weight 73 and has a brake disc 76 being connected to a sun wheel 72 of the differential gear, as well as a braking and release arrangement which acts by means of the lever 77 on the brake disc 76 and a trip lever 79 controlled by eccentric from the motor 75 and has also a release pin 80. The release pin is arranged on a storage disc 81 which is driven by the shaft of the planet wheel 71 of the differential gear, while the second sun wheel 70 of this gear is connected to the shaft 68 of the summation meter 23.

If no impulse is transmitted to the transmitter arrangement the parts of the latter are in the position shown in Figure 2, which is to say that the transmitter contact 74 is open and the auxiliary motor 75 is held by the lever 77.

If the shaft 68 rotates for one metering unit the storage disc 81 is rotated by means of the sun wheel 70 and the planet wheel 71 in the clockwise direction, and the release pin 80 releases the lever 77 from the lever 79, with the result that the release of the brake disc 76 causes the auxiliary motor 75, which is always under network voltage, to begin to operate and to rotate the sun wheel 72 in the oposite direction to that of the sun wheel 70. This causes the storage disc 81 to rotate also in the opposite direction, so that the pin 80 is also moved away from the trip lever. During the rotation of the motor 75 the weight 73 tips over and closes temporarily the transmitter contact 74 producing thereby the transmitting impulse. By means of the eccentric 78 driven simultaneously by the motor 75 the trip lever 79, remaining approximately parallel to itself, is imparted an up-and-down motion and engages again with the lever 77, braking the motor 75 to a stop. The emission of a sending impulse as described requires of course a little time. If meanwhile additional metering units arrive from the metering mechanism 23, these are stored by the disc 81, the latter shifting for a corresponding value in the clockwise direction. If several metering units have been stored in this manner, the auxiliary motor 75 runs after release until the number of sending impulses corresponding to these metering units have been emitted.

The invention in its broader aspects is not limited to the specific mechanisms shown and described but departures may be made therefrom within the scope of the accompanying claim without departing from the principles of the invention and without sacrificing its chief advantages.

What is claimed is:

Apparatus for totalizing pulses, including in combination a plurality of positive pulse escapement devices, at least one negative pulse escapement device, a plurality of remotely controlled relays, individually controlling said escapement devices, individually totalizing registers separately actuated by said escapement devices, a common branched driving means powering said escapement devices through its several branches, said relays releasing their respective escapement devices independently of each other, said branched driving means, including a unidirectional motor and a succession of differential gearings for distributing the driving power between said motor and said individual registers, said differential gearing being interconnected so that the first differential drives two differentials, at least one of which drives two additional differentials; and a summation meter, means connecting said meter to said common branched driving means, said last named means comprising a differential drive having two sun gears, one sun gear being connected to the planetary gear of said common branched driving means lying nearest to the driving motor, the other sun gear being connected to said negative pulse escapement device through gearing having a 1:2 step up ratio from said escapement device to said sun gear, the planetary gearing of said differential being connected to said meter.

References Cited in the file of this patent

UNITED STATES PATENTS

| | | |
|---|---|---|
| 417,840 | Ross | Dec. 24, 1889 |
| 1,616,028 | Cooney | Feb. 1, 1927 |
| 2,014,572 | Julius et al. | Sept. 17, 1935 |
| 2,018,858 | Landolt | Oct. 29, 1935 |
| 2,451,525 | Webb | Oct. 19, 1948 |
| 2,495,448 | Fehr | Jan. 24, 1950 |